United States Patent
Althouse et al.

(10) Patent No.: US 11,128,606 B2
(45) Date of Patent: **\*Sep. 21, 2021**

(54) CLIENT FINGERPRINTING FOR INFORMATION SYSTEM SECURITY

(71) Applicant: salesforce.com, inc., San Francisco, CA (US)

(72) Inventors: John Brooke Althouse, Round Hill, VA (US); Jeffery S. Atkinson, Ashburn, VA (US); Joshua Atkins, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/708,211

(22) Filed: Dec. 9, 2019

(65) Prior Publication Data

US 2020/0120072 A1    Apr. 16, 2020

Related U.S. Application Data

(63) Continuation of application No. 15/589,220, filed on May 8, 2017, now Pat. No. 10,536,439.

(51) Int. Cl.
*G06F 21/00* (2013.01)
*H04L 29/06* (2006.01)
(Continued)

(52) U.S. Cl.
CPC ........ *H04L 63/0428* (2013.01); *H04L 9/0643* (2013.01); *H04L 9/3236* (2013.01);
(Continued)

(58) Field of Classification Search
CPC ............. H04L 63/0428; H04L 63/0876; H04L 9/3236; H04L 43/028; H04L 9/0643;
(Continued)

(56) References Cited

U.S. PATENT DOCUMENTS 5,577,188 A    11/1996    Zhu
5,608,872 A    3/1997    Schwartz et al.
(Continued)

OTHER PUBLICATIONS

Husák, M., Čermák, M., Jirsík, T., & Čeleda, P. (2016). HTTPS traffic analysis and client identification using passive SSL/TLS fingerprinting. EURASIP Journal on Information Security, 2016(1), 1-14. (Year: 2016).*
(Continued)

*Primary Examiner* — Alexander Lagor
(74) *Attorney, Agent, or Firm* — Schwabe Williamson & Wyatt (57) ABSTRACT

Client fingerprints can be used to detect and defend against malware and hacking into information systems more effectively than using IP addresses. A unique client fingerprint can be based on data found in the client's SSL client hello packet. SSL version, cipher suites, and other fields of the packet can be utilized, preferably utilizing individual field values in the order in which they appear in the packet. The ordered values are converted to decimal values, separated by delimiters, and concatenated to form an identifier string. The identifier string may be mapped, preferably by a hash function, to form the client fingerprint. The client fingerprint may be logged, and whitelists and blacklists may be formed using client fingerprints so formed.

19 Claims, 6 Drawing Sheets

(51) Int. Cl.
*H04L 12/26* (2006.01)
*H04L 9/32* (2006.01)
*H04L 9/06* (2006.01)

(52) U.S. Cl.
CPC ............ *H04L 43/028* (2013.01); *H04L 43/04* (2013.01); *H04L 63/0876* (2013.01); *H04L 63/0272* (2013.01); *H04L 63/101* (2013.01); *H04L 63/166* (2013.01)

(58) Field of Classification Search
CPC ... H04L 43/04; H04L 63/166; H04L 63/0272; H04L 63/101
See application file for complete search history.

(56) References Cited

U.S. PATENT DOCUMENTS

| | | | |
|---|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,244,799 B1 | 8/2012 | Salusky et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0043825 A1* | 3/2003 | Magnussen ........... H04L 49/602 370/401 |
| 2003/0066031 A1 | 4/2003 | Laane et al. |
| 2003/0066032 A1 | 4/2003 | Ramachandran et al. |
| 2003/0069936 A1 | 4/2003 | Warner et al. |

(56) References Cited

U.S. PATENT DOCUMENTS

| | | |
|---|---|---|
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0252036 A1* | 10/2009 | Fong .................. H04L 45/245 370/231 |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0359537 A1 | 12/2014 | Jackobson et al. |

OTHER PUBLICATIONS

Husák, M., Čermák, M., Jirsík, T. et al., "HTTPS traffic analysis and client identification using passive SSL/TLS fingerprinting", EURASIP J. on Info. Security, (2016) 2016 (Year: 2016).*

Square Lemon Blog; TLS Fingerprinting, Smarter Defending & Stealthier Attacking, https://blog.squarelemon.com/tls-fingerprinting/; Posted Sep. 25, 2015.

Husak, M., Cermak, M., Jirsfk, T. et al., "HTTPS traffic analysis and client identification using passive SSL/TLS fingerprinting", EURASIP J. on Info. Security (2016) 2016 (Year: 2016).

* cited by examiner

CLIENT FINGERPRINTING FOR INFORMATION SYSTEM SECURITY

RELATED CASE

This application is a continuation of application Ser. No. 15/589,220 filed May 8, 2017, the contents of which is incorporated herein in its entirety by reference.

COPYRIGHT NOTICE

Copyright 2017 salesforce.com, inc. A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

The technology relates to information system security improvements by managing access by remote clients.

BACKGROUND

Historically, access to information systems may be limited to authorized users or clients. Clients may be identified by various means, for example, IP address, and client identifiers may be used to permit, or conversely deny, access to an information system. The need remains for improvements in client identification to improve information system security robustness and performance.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

The common use of IP addresses to control access to a host system, for example, a database system or application service provider, although convenient, is not reliable and is easily circumvented. Known client fingerprinting techniques based on the TLS client hello packet are slow, cumbersome and inconvenient. The need remains for techniques to fingerprint SSL clients at line speed with outputs that are easily searchable, sharable, and for methods that can easily be duplicated across different platforms.

I. Example System Overview

Figure 1A:
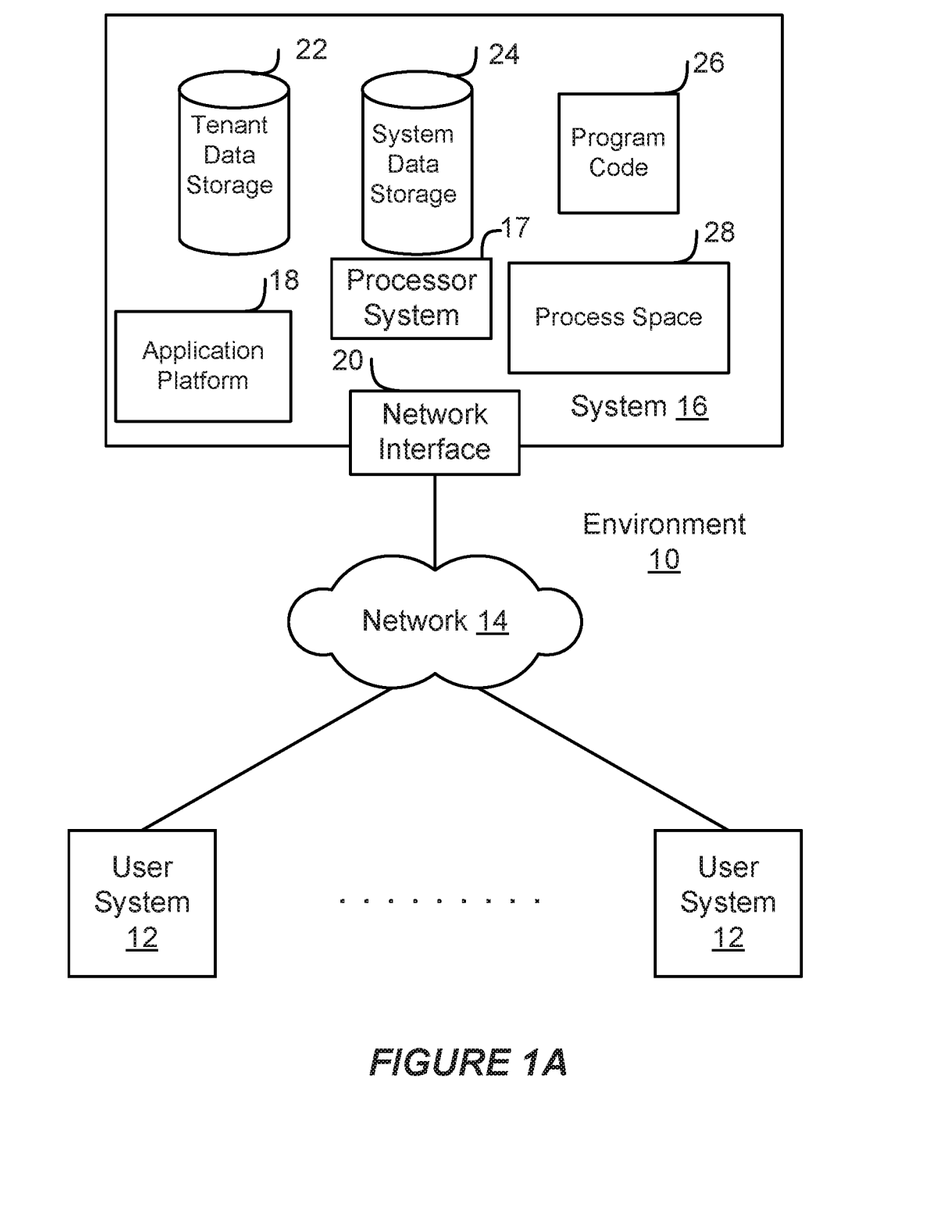
FIG. 1A shows a block diagram of an example environment in which an on-demand database service can be used according to some implementations.

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
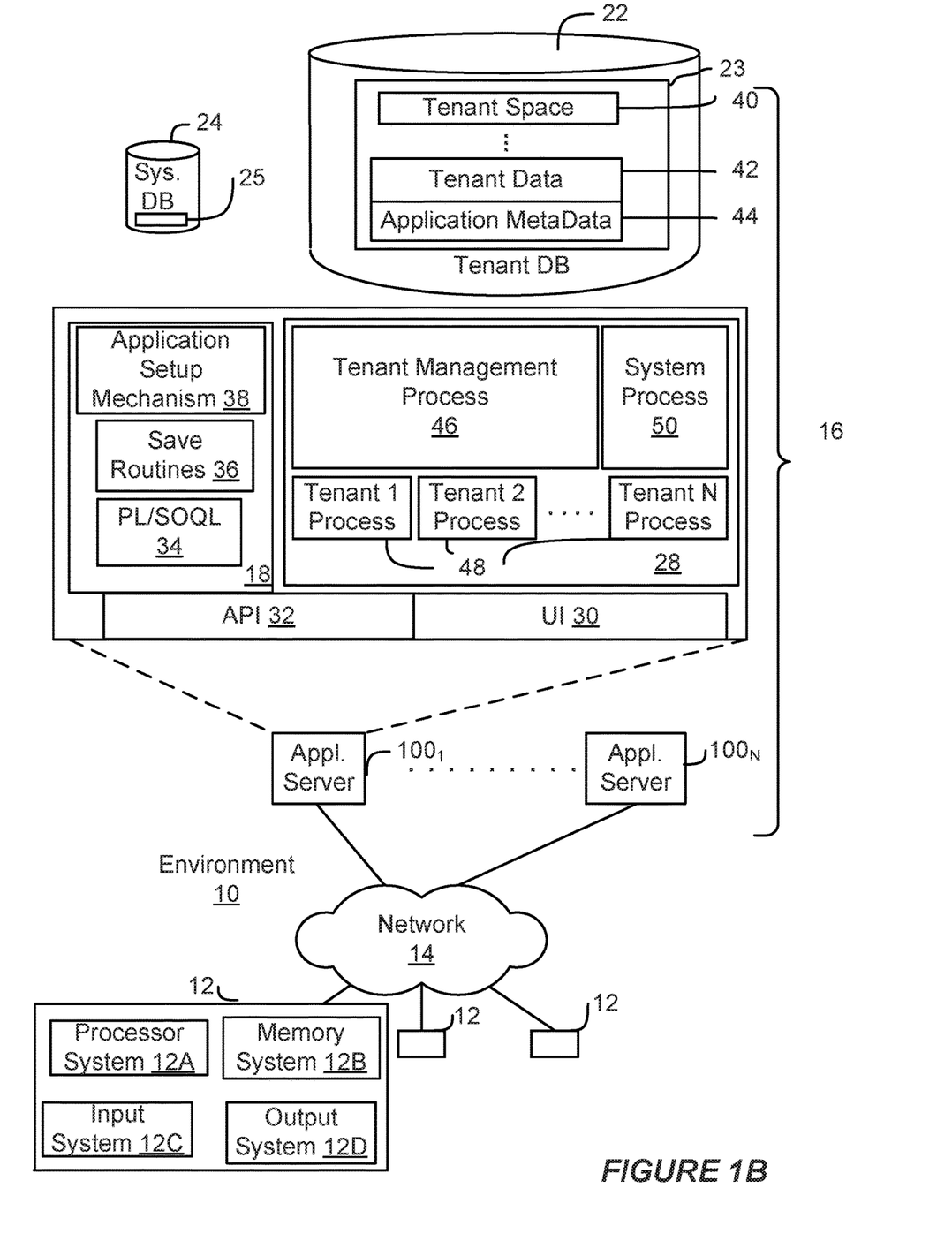
FIG. 1B shows a block diagram of example implementations of elements of FIG. 1A and example interconnections among these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 40, which can be physically or logically arranged or divided. Within each tenant storage space 40, user storage 42 and application metadata 44 can similarly be allocated for each user. For example, a copy of a user's most recently used (MRU) items can be stored to user storage 42. Similarly, a copy of MRU items for an entire organization that is a tenant can be stored to tenant storage space 40.

The process space 28 includes system process space 102, individual tenant process spaces 48 and a tenant management process space 46. The application platform 18 includes an application setup mechanism 38 that supports application developers' creation and management of applications. Such applications and others can be saved as metadata into tenant database 22 by save routines 36 for execution by subscribers as one or more tenant process spaces 48 managed by tenant management process 46, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 44 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Fingerprinting SSL Clients

Figure 2:
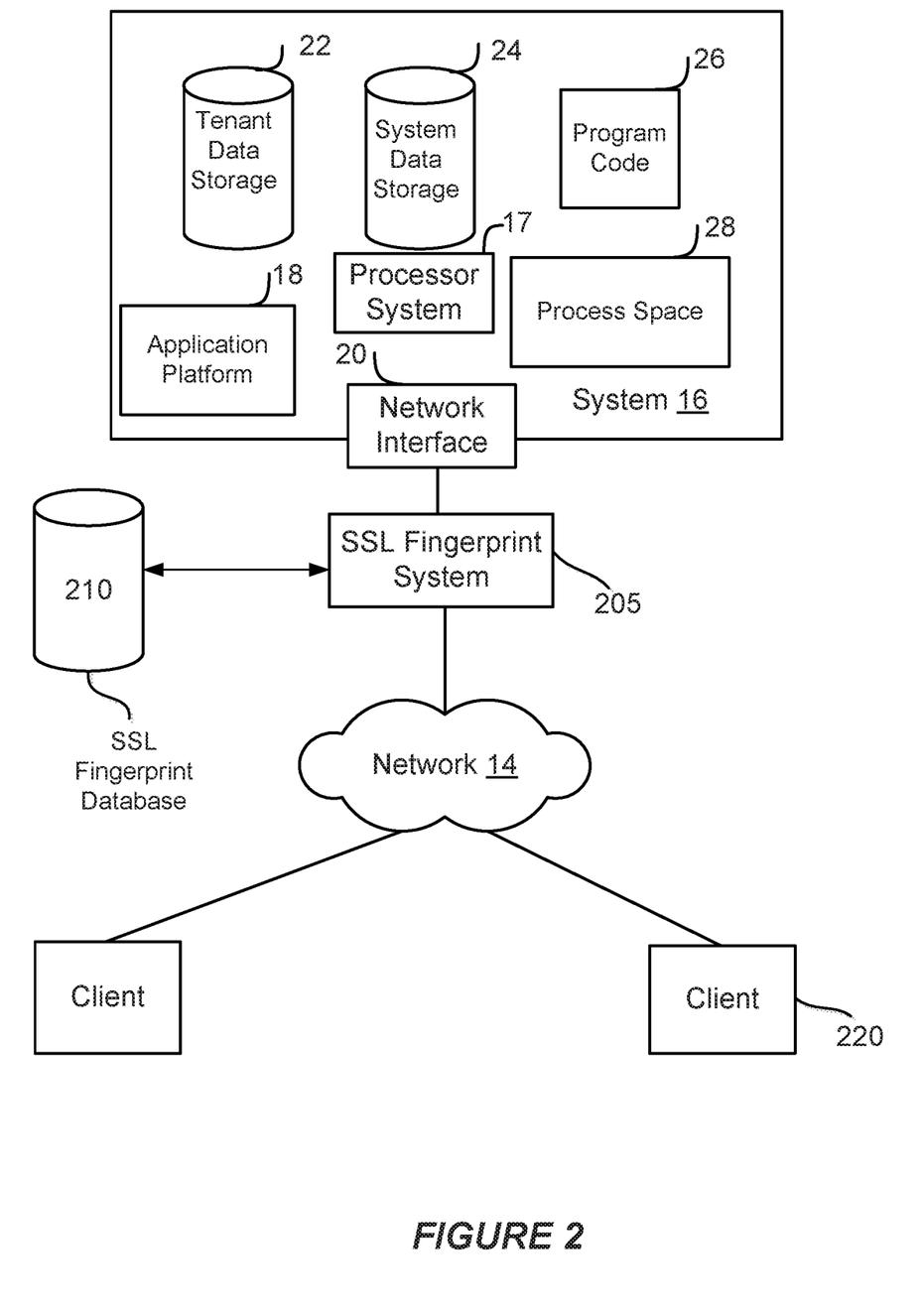
FIG. 2 shows a simplified block diagram of example implementations in which an SSL fingerprint system is provisioned in an information system consistent with the present disclosure.

FIG. 2 shows a simplified block diagram of example implementations in which an SSL fingerprint system 205 is provisioned in a database service 16 for user authentication. Preferably, the fingerprint system may be implemented in software as further described later. In one example, it may be realized in a script or scripting language such as Broscript. "Bro" is an open source Unix based network security monitoring framework, see https://bro.org Selected elements of FIGS. 1A and 1B are shown in FIG. 2, with the reference numbers retained. A fingerprint system 205 may be coupled to a fingerprint database system 210. The database 210 may be configured to store client fingerprints generated by the system 205 based on SSL client sessions that traverse the network 14 from a client 220 to access the system 16 as explained in more detail below. The database system 210 may be configured to include metadata for at least some of the stored fingerprint records, for example, indicating timestamps, IP address, or a security indicator such as "OK" (permit access), "Block Access," "Suspicious" etc. These particular labels are not critical and many other indicators may be used. The concept is to enable storing security indicators to better control access to an information system such as system 16. In some embodiments, Broscripts can be used to raise an alert, or execute commands such as writing to or updating client fingerprint information in the database system 210.

In some embodiments, a database such as 210 may be used to generate or maintain a blacklist of clients (identified by fingerprints as described herein) to be denied access to an information system as they present a security risk. The database or the blacklist may be amended by importing data from other networks or other network security resources. Conversely, a blacklist may be exported to others systems for their use. Such information, both blacklists and known good ("whitelist") data may be distributed throughout the security industry to everyone's benefit.

TLS and its predecessor SSL (Secure Sockets Layer) is the standard security technology or protocol for establishing an encrypted link between a web server and a browser or other client. This link is designed to ensure that all data passed between the server and the client remain confidential. In most online implementations, the 'client' is an internet browser and the 'server' is a website to which the browser is connected, but the present disclosure is not so limited. It is applicable to any program that creates a connection to a server. It can be used to identify mobile apps, for example.

Fundamentally, SSL works by utilizing certificates and encryption. A web page will display "https://" instead of "http://" before the website's address in the browser's address bar when SSL is in use.

The basic unit of data in SSL is a record. There are generally five record types in SSL, one of which is handshake records. Among the handshake records is the client hello. The Client Hello sends these attributes to the server:
1. Protocol Version: The version of the SSL protocol by which the client wishes to communicate during this session.
2. Session ID: The ID of a session the client wishes to use for this connection.
3. Cipher Suite: This is passed from the client to the server in the Client Hello message. It contains the combinations of cryptographic algorithms supported by the client in order of the client's preference (first choice first). Each cipher suite defines both a key exchange algorithm and a cipher specification. The server selects at least one of the cipher suites or, if no acceptable choices are presented, returns a handshake failure alert and closes the connection.
4. Compression Method: Includes a list of compression algorithms supported by the client. If the server does not support any method sent by the client, the connection fails. The compression method can also be null.
5. Extensions. A variety of extensions can be used to add functionality to TLS. See RFC 4366. In an example, the supported elliptical curves discussed below may be implemented as a TLS extension. Other extensions, for example, SessionTicket's and renegotiation, may be used as described herein, and combined with other selected data in forming the client fingerprint.

Figure 7:
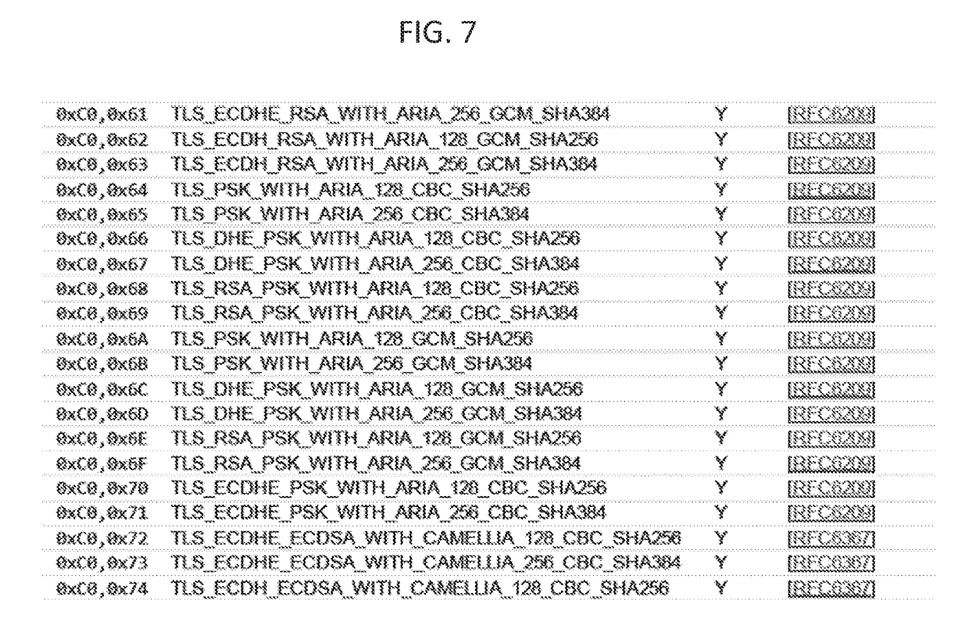
FIG. 7 shows a small sampling of example cipher suites that may be listed in a client hello packet.

The Cipher Suite is of particular interest here. Each cipher suite listed defines both a key exchange algorithm and a cipher specification, and there are many possible combinations. For example, there are over 300 standard cipher suites listed in the TLS cipher suite registry. FIG. 7 shows just a small sample clipped from the registry. Some popular browsers list 15 or 20 ciphers in their client hello packet. Additional fields of interest are described below.

Figure 3:
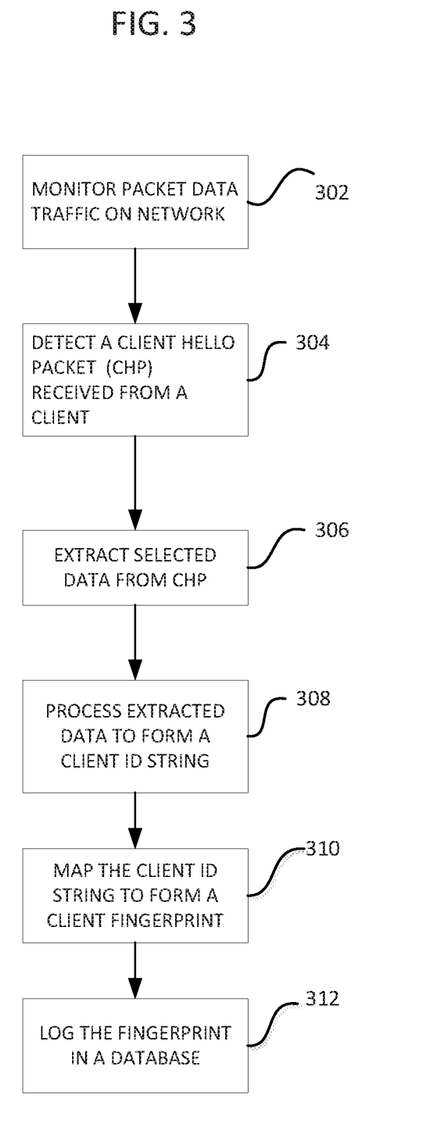
FIG. 3 shows a simplified flow diagram of an example process for fingerprinting a client based on a Transport Layer Security (TLS) client hello packet.

FIG. 3 shows a simplified flow diagram of an example process for fingerprinting a client based on a Transport Layer Security (TLS) or SSL client hello packet. The first step calls for monitoring packet data traffic over a network, step 302. Various tools such as Bro are known for this function. Another option may be Wireshark, a network packet analyzer. Next is detecting a client hello packet CHP received from a client seeking to begin a session, step 304. The client hello packet is sent in clear text to the server as the session is not yet encrypted. Indeed, much of the client hello packet is information needed to agree on encryption protocols to be used. The process then extracts selected data from the CHP at step 306. Specific examples are given below. At step 308, the method processes the extracted data to form a client ID string. Next, the client ID string is mapped to form a client fingerprint. Because of the wide variety of the information extracted from the CHP, from one client to another, the resulting client ID string, and the correspond fingerprint, will be unique for all practical purposes. In some embodiments, the mapping of step 310 may apply a hash function to the client ID to form the client fingerprint. In one embodiment, the hash function may return a fingerprint (a string of characters) 32 characters long. This length is not critical, but it is advantageous as it is easy to use in a variety of software tools. Finally, the fingerprint may be logged in a database. Post investigation of the database can be conducted, i.e. analysis to look for patterns that could reveal suspicious traffic, leveraging the client fingerprints as reliable, unique identifiers.

Figure 6:
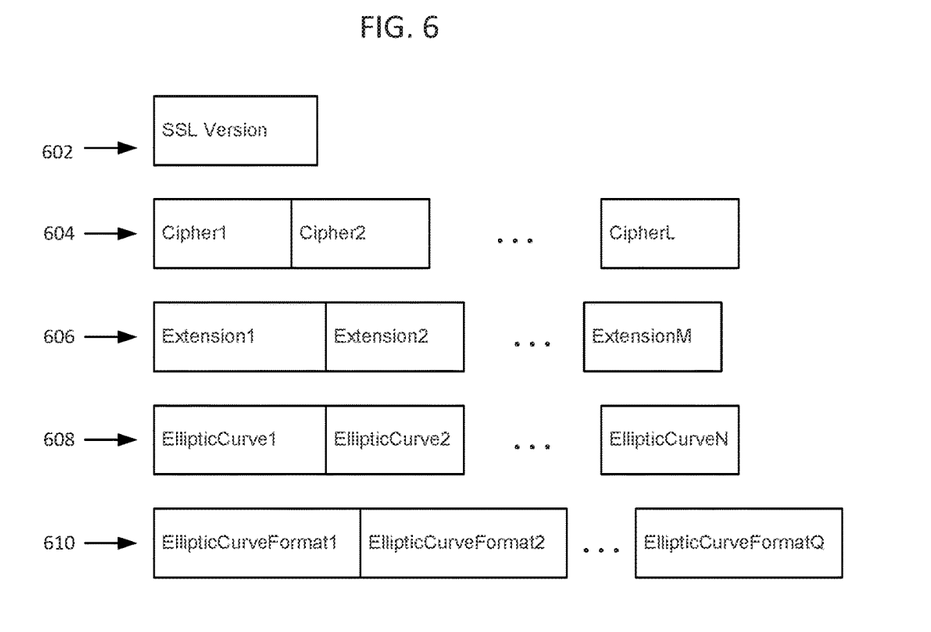
FIG. 6 is a simplified block diagram illustrating selected fields of a TLS client hello packet.

FIG. 6 shows a simplified block diagram representing the relevant CHP fields in the order in which they appear. First is the SSL version 602. Next, 604 represents a series of cipher suites, having values Cipher1 to Cipher L. The number of values (Cipher suites) listed may vary by client. Some clients may list only a few, while others may list scores of cipher suites. At 606 there may be zero or more Extensions listed, 1-M. These refer to TLS extensions described in RFC 3546, Transport Layer Security (TLS) Extensions. At 608, the packet may include zero or more elliptic curve identifiers, numbered 1-N. These refer to Elliptic Curve Cryptography (ECC), a relatively new public key cryptography technology that may be used in TLS. See RFC 4492, *Elliptic Curve Cryptography (ECC) Cipher Suites for Transport Layer Security (TLS)*. That document it specifies the use of Elliptic Curve Diffie-Hellman (ECDH) key agreement in a TLS handshake and the use of Elliptic Curve Digital Signature Algorithm (ECDSA) as a new authentication mechanism.

Finally, indicated at 610, the packet may include zero or more Elliptic Curve Formats, numbered 1-Q in the drawings. Some packets may not have values for all of these fields. The order of the values within a given field, say the cipher suites identifiers, is significant. Recall they are arranged in order of preference by the client. Consequently, even where two clients list an identical set of cipher suites in their respective client hello packets, the order may be different, and that order will lead to an entirely different client fingerprint.

Figure 4:
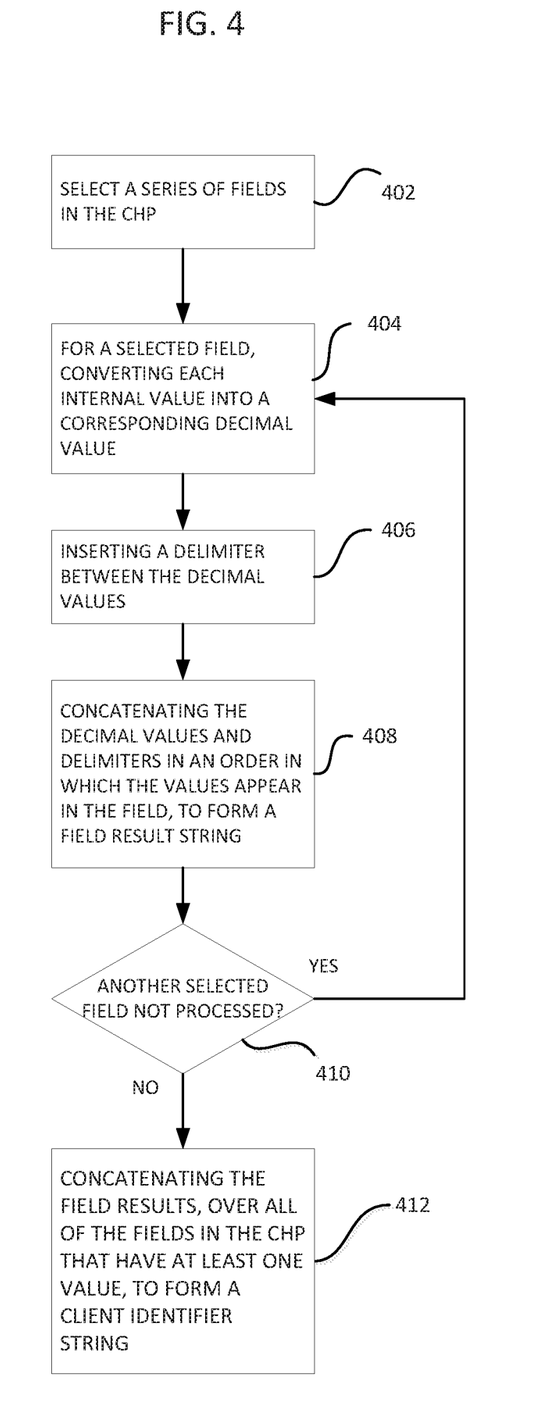
FIG. 4 shows a simplified flow diagram of an example process for generating a client identifier string based on aspects of a client hello packet.

FIG. 4 shows a simplified flow diagram of another example process for generating a client identifier string based on aspects of a client hello packet. The process begins with identifying a selected series of fields in the CHP, step 402. The selected fields may include an SSL version identifier, a series of cipher suites identifiers, a series of extension identifiers, etc. Other fields may include elliptic curves cipher suites and elliptic curve formats. Referring again to FIG. 4, at step 404, for a selected field, the process converts each listed value (in hex) to a corresponding decimal value. The original order of the values preferably is maintained, or a different but defined order may be used. A predetermined delimiter may be inserted in between each of the decimal values, step 406. Next, the process calls for concatenating the decimal values, and the inserted delimiters, to form a field result string, step 408. For example, a cipher suites field result string, or an extension field result string. If a field has no values, delimiters are persisted (see example below). For a single-valued field, namely the SSL version, the decimal equivalent becomes the field result string in this context. After a given field result string is generated, step the process tests whether another field in the packet is not yet processed, decision 410. If so, the process loops to 404 and processes the next field, preferably in the order in which they appear in the CHP. Each field results in a corresponding field result string at 408. Finally, at step 412, all of the field result strings are concatenated, with a second predetermined delimiter inserted in between each of the field result strings, to form a complete client identifier string. This identifier string may be hashed to form a corresponding client fingerprint.

Figure 5:
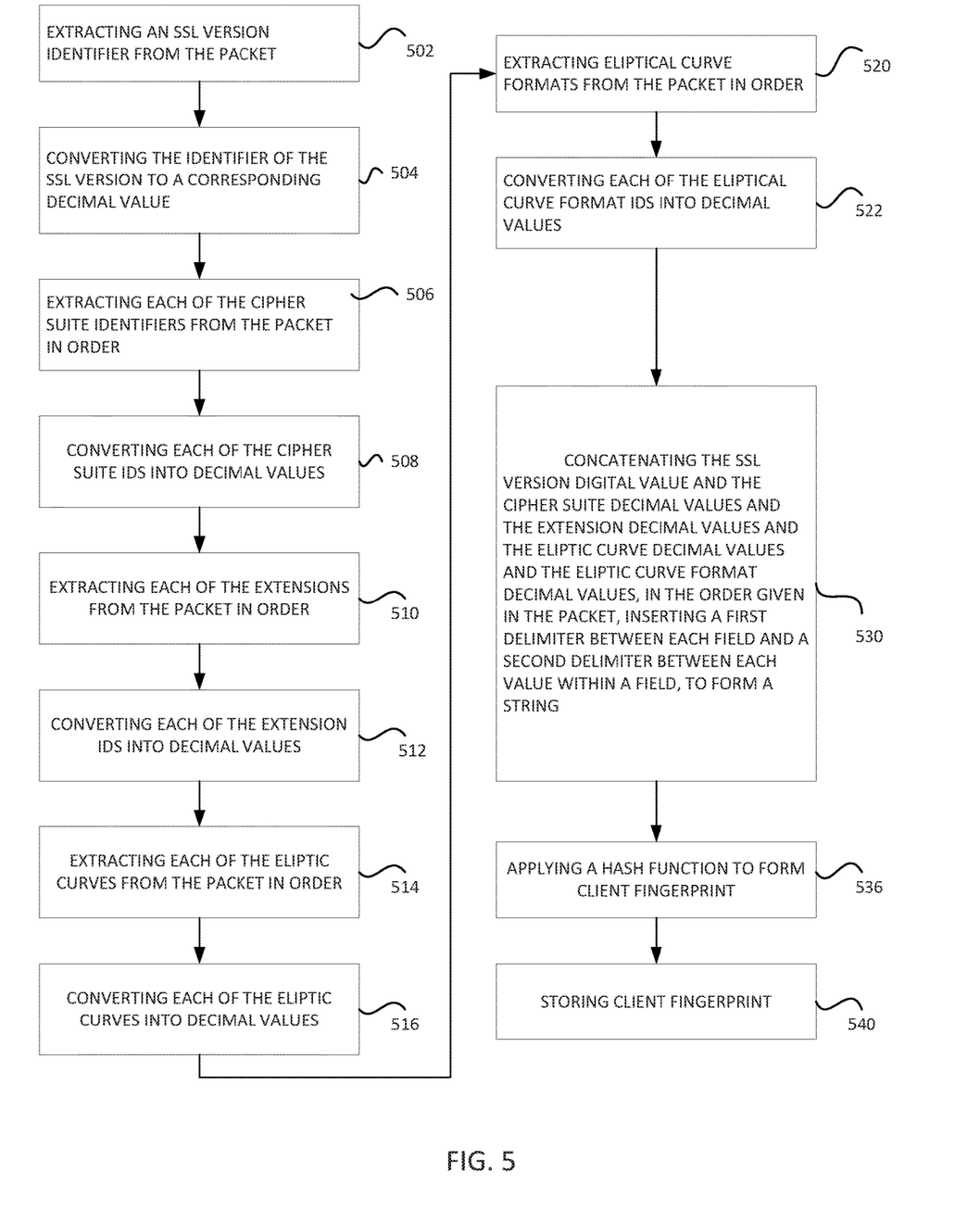
FIG. 5 is a simplified conceptual diagram illustrating a more detailed example process for generating a client identifier string based on aspects of a client hello packet.

FIG. 5 is a simplified flow diagram illustrating a more detailed example process for generating a client identifier string based on aspects of a client hello packet. In this example, the process calls for extracting an SSL Version identifier from the packet, step 502; converting the identifier of the SSL Version to a corresponding decimal value, step 504; extracting each of the Cipher Suite identifiers from the packet in order, step 506; converting each of the cipher suite ids into decimal values, step 508; extracting each of the extensions from the packet in order, step 510; converting each of the extension ids into decimal values, step 512; extracting each of the elliptic curves from the packet in order, step 514; converting each of the elliptic curves into decimal values, step 516; extracting elliptical curve formats from the packet in order, step 520; converting each of the elliptical curve format ids into decimal values, step 522; concatenate the SSL version digital value and the cipher suite decimal values and the extension decimal values and the elliptic curve decimal values and the elliptic curve format decimal values, in the order given in the packet, inserting a first delimiter between each field and a second delimiter between each value within a field, to form a string, step 530; applying a hash function to form client fingerprint, step 536; and storing the client fingerprint, step 540.

EXAMPLE

In this example, a process takes the decimal value of the hex characters in the SSL Client Hello, concatenates certain values together, in order, delimited by a "," for each field and a "-" for each value. The order is shown below. A different order may be used, as long as the selected algorithm is applied consistently.
SSLVersion,Cipher1-Cipher2-CipherL,Extension1-ExtensionM,EllipticCurve1-EllipticCurveN,EllipticCurveFormat1-EllipticCurveFormatQ Specific Example; Content of CHP, with values converted to decimal: 769,47-53-5-10-49161-49162-49171-49172-50-56-19-4,0-10-11,23-24-25,0

Above, we can see 769 is the SSL version, converted to decimal. Then a series of cipher suites are listed, again each of them having an identifier converted to a decimal equivalent. There are 12 values listed, delimited by hyphens, while the field is delimited by commas. The next (third) field is the Extensions; here identified by decimal equivalents 0-10-11, again delimited by commas. The last two fields of interest are Elliptic Curves (23-24-25) and Elliptic Field Formats (0).

If there are no SSL Extensions in the Client Hello, the "," delimiters persist. Here is an example of the concatenated decimal string: 769,4-45-510-109-9100-10098-983-36-619-1918-1899-99 . . . .

Next these strings are hashed, preferably using the MD5 algorithm, to produce the SSL Client Fingerprint. It is 128 bits long or 32 hex characters. 769,47-53-5-10-49161-49162-49171-49172-50-56-19-4,0-10-11,23-24-25, 0==ada70206e40642a3e4461f35503241d5

In the other case, using only the SSL version and cipher suites: 769,4-5-10-9-100-98-3-6-19-18-99 . . . ==de 35086968c85de67a350c8d186f11e6

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. A computer-implemented method for a database system, comprising:
monitoring packet data traffic on a network connection to the database system, to detect a Client Hello packet (CHP);
processing selected data from the CHP to form an SSL client identifier string, wherein processing the selected data includes:
for each set of fields of the CHP, converting hex values into a corresponding decimal value, selectively inserting a value delimiter between the decimal values, and concatenating the decimal values and the value delimiters in an order in which the values appear in the field, to form a field result string; and
applying a selected hash function to the SSL client identifier string to form an SSL client fingerprint that is based on an order of data in the set of fields.

2. The method of claim 1, wherein the SSL client identifier string includes field results that are arranged in a sequence based on an order in which the fields are listed in the CHP, and a predetermined field delimiter after each field result string.

3. The method of claim 2, wherein the selected data fields comprise: an SSL Version field, a cipher suite field, and an extension field.

4. The method of claim 3, wherein the fields further comprise an elliptic curve field.

5. The method of claim 1, wherein processing the data further includes inserting a field delimiter after each field in the SSL client identifier string; and concatenating the fields and the field delimiters to form the SSL client identifier string.

6. The method of claim 5, wherein processing the data further includes inserting a value delimiter after each decimal value within a field of the SSL client identifier string.

7. The method of claim 1, wherein the selected hash function is an MD5 hash function.

8. The method of claim 1, wherein processing the extracted data further includes persisting at least one field delimiter in the SSL client identifier string in the absence of data in the CHP for a corresponding field.

9. The method of claim 1, and further comprising:
receiving a security indication for a specified SSL client fingerprint; and updating the database based on the security indication.

10. The method of claim 1, and further comprising:
extracting data from the database to form a log of SSL client fingerprints that identify clients that accessed the database system.

11. A non-transitory, computer readable medium storing instructions executable by a processor to cause the processor to realize a client fingerprinting component, including carrying out the operations of:
monitoring packet data traffic on a network connection to the database system, to detect a Client Hello packet (CHP);
processing selected data from the CHP to form an SSL client identifier string, wherein processing the selected data includes:
for each set of fields of the CHP, converting hex values into a corresponding decimal value, selectively inserting a value delimiter between the decimal values, and concatenating the decimal values and the value delimiters in an order in which the values appear in the field, to form a field result string; and
applying a selected hash function to the SSL client identifier string to form an SSL client fingerprint that is based on an order of data in the set of fields.

12. The computer readable medium of claim 11, wherein the SSL client identifier string includes field results that are arranged in a sequence based on an order in which the fields are listed in the CHP, and a predetermined field delimiter after each field result string.

13. The computer readable medium of claim 12, wherein selected data fields comprise: an SSL Version field, a cipher suite field, and an extension field.

14. The computer readable medium of claim 13, wherein the fields further comprise an elliptic curve field.

15. The computer readable medium of claim 11, wherein processing the extracted data further includes inserting a field delimiter after each field in the SSL client identifier string; and concatenating the fields and the field delimiters to form the SSL client identifier string.

16. A system comprising:
one or more processors;
one or more memory devices communicatively coupled with the one or more processors, at least one of the one or more memory devices comprising instructions that when executed cause at least one processor of the one or more processors to:

monitor packet data traffic sent over a network connection for a Client Hello packet (CHP);

for each set of fields of the CHP,
- convert hex values in the CHP into corresponding decimal values,
- selectively insert a value delimiter between the decimal values, and
- concatenate the decimal values and the value delimiters in an order in which the decimal values and the value delimiters appear in the field, to form an SSL client identifier string; and apply a selected hash function to the SSL client identifier string to form an SSL client fingerprint that is based on an order of data in the set of fields.

17. The system of claim 16, wherein the SSL client identifier string includes field results that are arranged in a sequence based on an order in which the fields are listed in the CHP, and a predetermined field delimiter after each field result string.

18. The system of claim 17, wherein the set of fields comprise: an SSL Version field, a cipher suite field, and an extension field.

19. The system of claim 18, wherein the set of fields further comprise an elliptic curve field.

* * * * *